United States Patent
Wang et al.

(10) Patent No.: US 11,326,318 B2
(45) Date of Patent: May 10, 2022

(54) LATERAL WATER INTAKE STRUCTURE FOR PREVENTING SILTING OF BED LOAD AND FLOATING DEBRIS

(71) Applicants: China Institute of Water Resources and Hydropower Research, Beijing (CN); China Yangtze Power Co., Ltd., Hubei (CN)

(72) Inventors: Dangwei Wang, Beijing (CN); Anjun Deng, Beijing (CN); Ye Yin, Hubei (CN); Qingchao Guo, Beijing (CN); Xinlei Guo, Beijing (CN); Tianjie Lei, Beijing (CN); Hantao Wang, Hubei (CN); Cuihua Chen, Hubei (CN); Hongling Shi, Beijing (CN); Qin Lu, Beijing (CN)

(73) Assignees: China Institute of Water Resources and Hydropower Research, Beijing (CN); China Yangtze Power Co., Ltd., Yichang (CN)

( * ) Notice: Subject to any disclaimer, the term of this patent is extended or adjusted under 35 U.S.C. 154(b) by 0 days.

(21) Appl. No.: 17/148,584

(22) Filed: Jan. 14, 2021

(65) Prior Publication Data
US 2022/0064888 A1    Mar. 3, 2022

(30) Foreign Application Priority Data
Aug. 28, 2020    (CN) .......................... 202010885790.1

(51) Int. Cl.
E02B 9/04    (2006.01)

(52) U.S. Cl.
CPC ...................................... *E02B 9/04* (2013.01)

(58) Field of Classification Search
CPC ... E02B 9/04; E02B 5/08; E02B 5/085; E02B 8/026
See application file for complete search history.

(56) References Cited

U.S. PATENT DOCUMENTS

| | | | |
|---|---|---|---|
| 5,779,888 A * | 7/1998 | Bennett | B01D 29/05 210/162 |
| 6,524,028 B2 * | 2/2003 | Bryan | A01K 61/00 405/81 |
| 6,726,404 B2 * | 4/2004 | Nestler | E02B 1/006 405/81 |
| 7,294,256 B2 * | 11/2007 | Happel | E03F 5/101 210/155 |
| 7,594,779 B2 * | 9/2009 | Hildstad | E02B 1/006 405/81 |
| 7,708,494 B2 * | 5/2010 | McLaughlin | E02B 8/08 405/81 |

(Continued)

*Primary Examiner* — Benjamin F Fiorello

(57) ABSTRACT

Provided is a lateral water intake structure for preventing silting of bed load and floating debris, which is provided at a river bank. The lateral water intake structure includes: a diversion canal, a guiding wall structure, a shaft-shaped water intaking space, and a trash rack. The lateral water intake structure functions to prevent the floating debris from gathering at the surface of the trash rack and reduce a risk that the trash rack is damaged by water pressure and hitting of the floating debris. Meanwhile, by using a water flow in the watercourse to continuously wash the floating debris near the trash rack, maintenance costs of removing the floating debris at the trash rack manually or mechanically can be reduced.

8 Claims, 1 Drawing Sheet

(56) References Cited

U.S. PATENT DOCUMENTS

2011/0146802 A1\* 6/2011 Feher ................ E02B 8/085
  137/1
2018/0056213 A1\* 3/2018 Inui ................ B01D 24/4636

\* cited by examiner

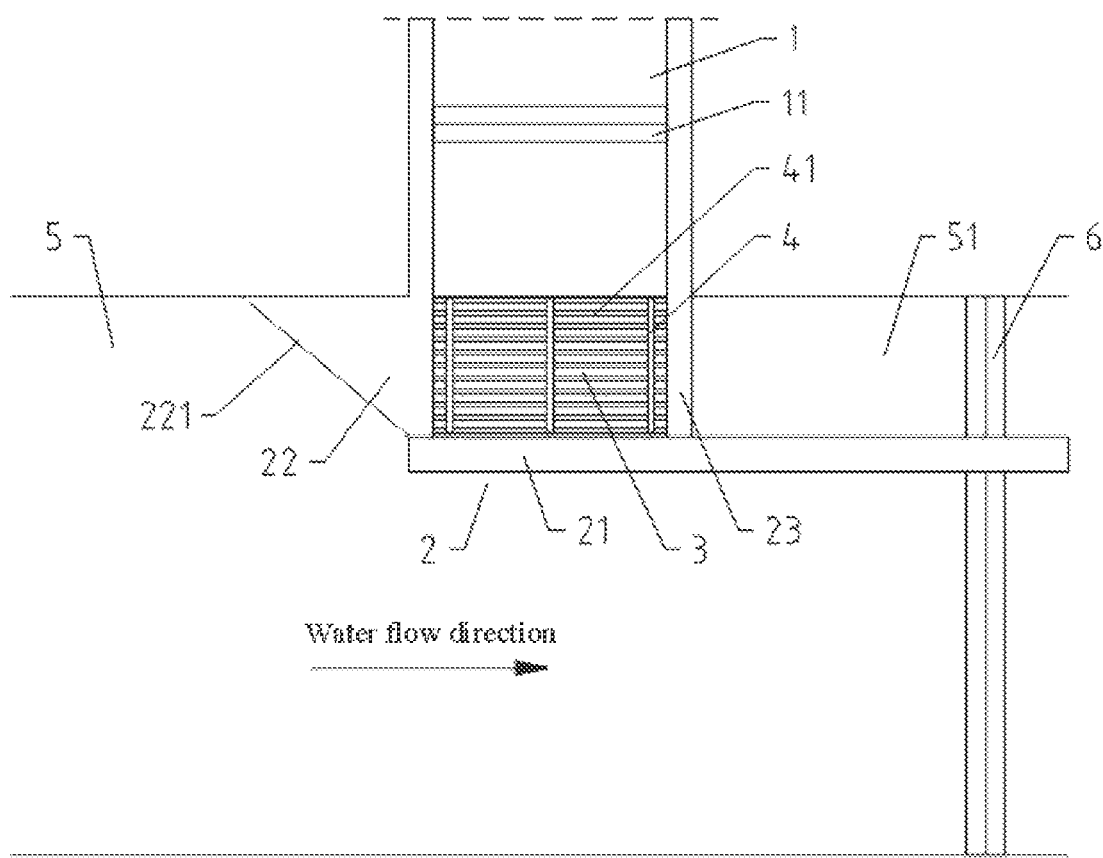

LATERAL WATER INTAKE STRUCTURE FOR PREVENTING SILTING OF BED LOAD AND FLOATING DEBRIS

CROSS-REFERENCE TO RELATED APPLICATIONS

This application claims the priority of Chinese patent application CN 202010885790.1, entitled "A lateral water intake structure for preventing silting of bed load and floating debris" and filed on Aug. 28, 2020, the entirety of which is incorporated herein by reference.

FIELD OF THE INVENTION

The present disclosure relates to the technical field of water intake structures at hydropower stations, and in particular, to a lateral water intake structure for preventing silting of bed load and floating debris.

BACKGROUND OF THE INVENTION

For low-dam or no-dam hydropower stations and industrial and agricultural water intaking, a water intake is usually provided at a river bank, which is called lateral water intaking. A lateral water intake has a relatively small water intaking depth, and it is easy for bed load to enter a water intaking system through the water intake and silt in a diversion canal so as to cause problems such as inadequacy in an amount of a water diversion flow. Meanwhile, in order to prevent floating debris from entering a generator set or a water diversion system, it is required to arrange a trash rack in front of the water intake. However, with a great deal of floating debris being blocked outside the water diversion system, the trash rack is gradually silted by the floating debris, which causes inadequacy in an amount of a flow entering the water diversion system or reduction in a water head for power generation.

Meanwhile, for existing lateral water intake structures, even a water flow in a watercourse cannot wash a surface of the trash rack, so that the floating debris silting at the surface of the trash rack cannot be taken away downstream by the water flow. After the floating debris gathers to a certain amount, the floating debris causes problems such as inadequacy in an amount of the water intaking flow and the head loss of power generation. At present, manners such as manual removal or mechanical removal are mostly used to process the floating debris silting the trash rack. A disadvantage of such manners is that the floating debris in front of the trash rack cannot be cleared in real time and continuously, and part of the floating debris still enters the diversion canal through the trash rack. In addition, removing the floating debris near the trash rack manually or mechanically is of high cost, and has certain operation difficulties.

SUMMARY OF THE INVENTION

With respect to the problems in existing technologies, the present application provides a lateral water intake structure for preventing silting of bed load and floating debris. By designing a manner of water feeding from bottom to up and a trash rack provided in parallel with a water surface, affecting a normal amount of water diversion of the diversion canal by silting of the floating debris can be avoided, and meanwhile maintenance costs of removing the floating debris at the trash rack manually or mechanically can be reduced by using a water flow to continuously wash the floating debris near the trash rack.

The present disclosure provides a lateral water intake structure for preventing silting of bed load and floating debris, which is provided at a river bank. The lateral water intake structure includes:

a diversion canal, which is provided at the river bank;

a guiding wall structure, which forms, jointly with the river bank, a shaft-shaped water intaking space at a corresponding water intake in a watercourse, a bottom of the water intaking space being lower than a water surface and higher than a river bottom, a top of the water intaking space is higher than the water surface; and a trash rack, which is provided at the bottom of the water intaking space in parallel with the water surface, and has a height lower than a height of a bottom of the diversion canal.

In an embodiment, the trash rack includes multiple bars provided side by side, and the bars are provided in parallel with a water flow direction. By the present embodiment, the floating debris stuck at the trash rack or attached to the trash rack can be easily washed away by a water flow.

In an embodiment, the guiding wall structure includes:

a first guiding wall, which is provided in the watercourse, in parallel with a water flow direction, and faces the water intake of the diversion canal;

a second guiding wall, which is located near an upstream side of the diversion canal, extends to the watercourse, and is connected to the first guiding wall; and a third guiding wall, which is located near a downstream side of the diversion canal, extends to the watercourse, and is connected to the first guiding wall.

In an embodiment, the second guiding wall is connected to an end of the first guiding wall. A surface of a side of the second guiding wall facing the water is a flow guiding surface used for guiding a water flow to a center of the watercourse, and an angle between the flow guiding surface and the river bank is an obtuse angle. By the present embodiment, the second guiding wall guides the water flow and the floating debris in the water flow to the center of the watercourse, so as to avoid affecting normal water intaking by gathering of the floating debris at the second guiding wall.

In an embodiment, the angle between the flow guiding surface and the river bank is larger than 145 degrees. By the present embodiment, this limitation of the angle can reduce a blocking effect to the water flow by the second guiding wall, to ensure that a speed of the water flow at the second guiding wall is not reduced too much due to blocking, so that the water flow can have enough kinetic energy to carry the floating debris to the center of the watercourse.

In an embodiment, a height of a bottom of the second guiding wall and a height of a bottom of the third guiding wall are both the same as the height of the bottom of the water intaking space. By the present embodiment, the water flow is not blocked in any way when passing through a bottom area of the water intaking space along the watercourse direction, and further the floating debris in the water flow does not gather at this area due to blocking.

In an embodiment, edges at two sides of the trash rack are respectively fixedly connected to the bottom of the second guiding wall and the bottom of the third guiding wall.

In an embodiment, the lateral water intake structure is applied to a diversion project with a dam:

the first guiding wall extends downstream along the water flow direction; and the watercourse located between the first guiding wall and the river bank at which the diversion canal is provided is a water intaking flow channel, and the water intaking flow channel is provided therein downstream of the diversion canal with a flood-discharging and sediment-flushing sluice. For a diversion project with a dam, the lateral water intake structure is located at a reservoir upstream of a dam body, and it is inevitable that the reservoir has an accumulation of bed load such as sediment. Therefore, by the present embodiment, the flood-discharging and sediment-flushing sluice is provided to discharge sediment, so as to avoid affecting a normal function of the water intake structure by accumulation of sediment.

In an embodiment, the trash rack has a size the same as a size of the bottom of the water intaking space. By the present embodiment, the water flow can pass through the trash rack and the water intaking space to a maximum extent and finally enter the diversion canal, so as to ensure an adequate amount of water diversion to the diversion canal.

In an embodiment, the diversion canal is provided therein with a diversion sluice.

The above technical features may be combined in various suitable manners or replaced with equivalent technical features, as long as the objective of the present disclosure can be realized.

Compared with existing technologies, the lateral water intake structure for preventing silting of bed load and floating debris provided in the present disclosure has at least the following beneficial effects.

By designing a manner of water feeding from bottom to up and a trash rack provided in parallel with a water surface, the lateral water intake structure in the present disclosure can have a function of preventing the floating debris from gathering at a surface of the trash rack, can avoid affecting a normal amount of water diversion of the diversion canal by silting of the floating debris, and can reduce a risk that the trash rack is damaged by water pressure and hitting of the floating debris. Meanwhile, by using a water flow in the watercourse to continuously wash the floating debris near the trash rack, maintenance costs of removing the floating debris at the trash rack manually or mechanically can be reduced.

BRIEF DESCRIPTION OF THE DRAWINGS

The present disclosure will be described in a more detailed way below based on embodiments and with reference to the accompanying drawing, in which:

The sole FIGURE shows a top view of a lateral water intake structure in the present disclosure.

In the accompanying drawing, the same components are indicated by the same reference signs. The accompanying drawing is not drawn according to actual proportions.

In the drawing, indications of respective reference signs are as follows:

1—diversion canal, 11—diversion sluice, 2—guiding wall structure, 21—first guiding wall, 22—second guiding wall, 221—flow guiding surface, 23—third guiding wall, 3—water intaking space, 4—trash rack, 41—bar, 5—watercourse, 51—water intaking flow channel, 6—flood-discharging and sediment-flushing sluice.

DETAILED DESCRIPTION OF THE EMBODIMENTS

The present disclosure is further illustrated below with reference to the drawing.

The present disclosure provides a lateral water intake structure for preventing silting of bed load and floating debris and this lateral water intake structure is applied to low-dam or no-dam hydropower stations and industrial and agricultural water intaking projects. The lateral water intake structure is provided at a river bank, and includes:

a diversion canal 1, which is provided at the river bank;

a guiding wall structure 2, which forms, jointly with the river bank, a shaft-shaped water intaking space 3 at a corresponding water intake in a watercourse 5, a bottom of the water intaking space 3 being lower than a water surface and higher than a river bottom, a top of the water intaking space 3 being higher than the water surface; and a trash rack 4, which is provided at the bottom of the water intaking space 3 in parallel with the water surface, and has a height lower than a height of a bottom of the diversion canal 1.

Specifically, as shown in the sole FIGURE, river water in the watercourse 5 enters the diversion canal 1 through the lateral water intake structure and is utilized. Herein, the water intaking space 3 is a tubular structure in the shape of a shaft formed by the guiding wall structure 2 and the river bank. The bottom of the water intaking space 3 is in communication with a water body in the watercourse 5, and the water intaking space 3 is provided in a side surface thereof with the water intake of the diversion canal 1. The river water enters the water intaking space 3 through the bottom of the water intaking space 3 from bottom to top, and enters the diversion canal 1 through the water intake.

In this process, floating debris emerging from the water or at the water surface is directly blocked by the guiding wall structure 2, and does not enter the water intaking space 3. Floating debris located in middle and lower layers of the river water is blocked by the trash rack 4, and thus cannot enter the water intaking space 3. In this way, a function of blocking the floating debris is realized. Meanwhile, since the trash rack 4 is provided in parallel with the water surface and the river water passes through the trash rack 4 from bottom to top, the floating debris in the river water does not silt at the trash rack 4 on a large scale. Moreover, since flowing of the river water has a great impact force, even if part of the floating debris is attached to the trash rack 4, the part of the floating debris may be washed away by continuous impact of a water flow; and besides, impacted by the water flow continuously, there is no gathering and sedimentation of floating debris and bed load near the trash rack 4.

Further, the lateral water intake structure in the present disclosure can have a function of preventing the floating debris from gathering at a surface of the trash rack 4, can avoid affecting a normal amount of water diversion of the diversion canal 1 by silting of the floating debris, and can reduce a risk that the trash rack 4 is damaged by water pressure and hitting of the floating debris. Meanwhile, by using the water flow in the watercourse 5 to continuously wash the floating debris near the trash rack 4, maintenance costs of removing the floating debris at the trash rack 4 manually or mechanically can be reduced.

Preferably, the trash rack 4 has a size the same as a size of the bottom of the water intaking space 3. In this way, the water flow can pass through the trash rack 4 and the water intaking space 3 to a maximum extent and finally enter the diversion canal 1, so as to ensure an adequate amount of water diversion to the diversion canal 1.

Preferably, the diversion canal 1 is provided therein with a diversion sluice 11.

In an embodiment, the trash rack 4 includes multiple bars 41 provided side by side, and the bars 41 are provided in parallel with a water flow direction.

Specifically, as shown in the sole FIGURE, the bars 41 provided side by side and in parallel on the trash rack 4 form a structure which blocks the floating debris and enables the water flow to pass through. Adjacent bars 41 are provided therebetween with gaps in a strip shape. The bars 41 being provided in parallel with the water flow direction means that the gaps in a strip shape are along the water flow direction. Therefore, even if part of the flowing debris is stuck in the gaps, the flowing debris can move along the gaps and washed away by the washing of the water flow. Besides, the bars 41 of the trash rack 4 may also block part of the rising bed load, so as to prevent the bed load and the floating debris from entering the diversion canal 1.

If the bars 41 are not provided in parallel with the water flow direction, the bars 41 have an effect of partially blocking the water flow. Under this circumstance, it is possible that part of the floating debris is stuck in the gaps due to the impact of the water flow, and further it is difficult for the floating debris to be washed away.

Further, as shown in the sole FIGURE, the trash rack 4 further includes multiple connection strips for connecting the multiple bars 41 provided side by side. The connection strips are perpendicular to the bars 41, and are also perpendicular to the water flow direction. When the connection strips are provided, the connection strips should be located on the same side of the multiple bars 41. When the trash rack 4 is mounted, the connection strips should be located at an upper side of the trash rack 4, so as to avoid the case that the connection strips provided at a lower side directly come in contact with the floating debris and thus block flowing of the floating debris. Besides, the number of the connection strips should be provided as small as possible.

In an embodiment, the guiding wall structure 2 includes:

a first guiding wall 21, which is provided in the watercourse 5, in parallel with the water flow direction, and faces the water intake of the diversion canal 1;

a second guiding wall 22, which is located near an upstream side of the diversion canal 1, extends to the watercourse 5, and is connected to the first guiding wall 21; and a third guiding wall 23, which is located near a downstream side of the diversion canal 1, extends to the watercourse 5, and is connected to the first guiding wall 21.

The first guiding wall 21, the second guiding wall 22, and the third guiding wall 23 jointly with the river bank form the water intaking space 3. The second guiding wall 22 is located at an upstream side of the water intaking space 3, and may directly block the floating debris at the water surface.

In an embodiment, the second guiding wall 22 is connected to an end of the first guiding wall 21. A surface of a side of the second guiding wall 22 facing the water is a flow guiding surface 221 used for guiding a water flow to a center of the watercourse 5, and an angle between the flow guiding surface 221 and the river bank is an obtuse angle.

Specifically, as shown in the sole FIGURE, a surface of a side of the second guiding wall 22 facing the water is an inclined plane. The surface is inclined toward a center of the watercourse 5 along the water flow direction, so as to guide the water flow and the floating debris in the water flow to the center of the watercourse 5 and to avoid a case that the water flow cannot enter the water intaking space 3 smoothly though a bottom area of the second guiding wall 22 due to gathering of the floating debris at the second guiding wall 22. Besides, the water flow has a faster speed at the center of the watercourse 5, so that the floating debris may be washed away more quickly.

Preferably, the angle between the flow guiding surface 221 and the river bank is larger than 145 degrees. A further limitation of the angle may reduce a blocking effect to the water flow by the second guiding wall 22, to ensure that the speed of the water flow at the second guiding wall 22 is not reduced too much due to blocking, so that the water flow can have enough kinetic energy to carry the floating debris to the center of the watercourse 5.

In an embodiment, a height of a bottom of the second guiding wall 22 and a height of a bottom of the third guiding wall 23 are both the same as the height of the bottom of the water intaking space 3.

Specifically, a height of a bottom of the second guiding wall 22 and a height of a bottom of the third guiding wall 23 are the same and are equal to the height of the bottom of the water intaking space 3. In this way, the water flow is not blocked in any way when passing through a bottom area of the water intaking space 3 along the watercourse 5 direction, and further the floating debris in the water flow does not gather at this area due to blocking.

In an embodiment, edges at two sides of the trash rack 4 are respectively fixedly connected to the bottom of the second guiding wall 22 and the bottom of the third guiding wall 23.

In an embodiment, the lateral water intake structure is applied to a diversion project with a dam.

The first guiding wall 21 extends downstream along the water flow direction. The watercourse 5 located between the first guiding wall 21 and the river bank at which the diversion canal 1 is provided is a water intaking flow channel 51, and the water intaking flow channel 51 is provided therein downstream of the diversion canal 1 with a flood-discharging and sediment-flushing sluice 6.

Specifically, for diversion projects with a dam, which are mostly low-dam hydropower stations, the lateral water intake structure is located at a reservoir upstream of a dam body, and it is inevitable that the reservoir has an accumulation of bed load such as sediment. Therefore, the flood-discharging and sediment-flushing sluice 6 is provided to discharge sediment, so as to avoid affecting a normal function of the water intake structure by an accumulation of sediment. For hydropower stations with no dam or agricultural water intaking project, since there is no dam body, there is no problem about the accumulation of bed load such as sediment, and therefore it is unnecessary to provide the flood-discharging and sediment-flushing sluice 6.

In the description of the present disclosure, it should be understood that orientations or positions indicated by terms, such as "upper", "lower", "bottom", "top", "front", "back", "inside", "outside", "left", "right", and the like, are based on the orientations or positions shown in the accompanying drawing, and are used simply for facilitating and simplifying the description of the present disclosure rather than for indicating or suggesting that a device or element being described must have a particular orientation or be configured and operated in a particular orientation. These terms therefore shall not be construed as limiting the present disclosure.

Although the present disclosure is described herein with reference to specific embodiments, it should be understood that these embodiments are only examples of principles and applications of the present disclosure. Therefore, it should be understood that various modifications can be made to the exemplary embodiments, and other arrangements can be designed, as long as the spirit and the scope of the present disclosure defined in the appended claims are not departed from. It should be understood that, different features described in dependent claims and in the text herein can be combined in a manner different from that described in the original claims. It should also be understood that, features described in conjunction with a single embodiment can be used in other embodiments described.

The invention claimed is:

1. A lateral water intake structure for preventing silting of bed load and floating debris, which is provided at a river bank, wherein the lateral water intake structure comprises:
   a diversion canal, which is provided at the river bank;
   a guiding wall structure, which forms, jointly with the river bank, a shaft-shaped water intaking space at a corresponding water intake in a watercourse, wherein a bottom of the water intaking space is higher than a river bottom; and
   a trash rack, which is provided at the bottom of the water intaking space in parallel with the water surface, and has a height lower than a height of a bottom of the diversion canal,
   wherein the guiding wall structure comprises:
   a first guiding wall, which is provided in the watercourse, in parallel with a water flow direction, and faces the water intake of the diversion canal;
   a second guiding wall, which is located near an upstream side of the diversion canal, extends to the watercourse, and is connected to the first guiding wall; and
   a third guiding wall, which is located near a downstream side of the diversion canal, extends to the watercourse, and is connected to the first guiding wall.

2. The lateral water intake structure for preventing silting of bed load and floating debris according to claim 1, wherein the trash rack comprises multiple bars provided side by side, and the bars are provided in parallel with a water flow direction.

3. The lateral water intake structure for preventing silting of bed load and floating debris according to claim 1, wherein the second guiding wall is connected to an end of the first guiding wall, wherein a surface of a side of the second guiding wall facing the water is a flow guiding surface used for guiding a water flow to a center of the watercourse, and an angle between the flow guiding surface and the river bank is an obtuse angle.

4. The lateral water intake structure for preventing silting of bed load and floating debris according to claim 3, wherein the angle between the flow guiding surface and the river bank is larger than 145 degrees.

5. The lateral water intake structure for preventing silting of bed load and floating debris according to claim 1, wherein edges at two sides of the trash rack are respectively fixedly connected to the bottom of the second guiding wall and the bottom of the third guiding wall.

6. The lateral water intake structure for preventing silting of bed load and floating debris according to claim 1, wherein the lateral water intake structure is applied to a diversion project with a dam:
   the first guiding wall extends downstream along the water flow direction; and the watercourse located between the first guiding wall and the river bank at which the diversion canal is provided is a water intaking flow channel, and the water intaking flow channel is provided therein downstream of the diversion canal with a flood-discharging and sediment-flushing sluice.

7. The lateral water intake structure for preventing silting of bed load and floating debris according to claim 1, wherein the trash rack has a size the same as a size of the bottom of the water intaking space.

8. The lateral water intake structure for preventing silting of bed load and floating debris according to claim 1, wherein the diversion canal is provided therein with a diversion sluice.

* * * * *